United States Patent [19]
Neier et al.

[11] 3,865,606
[45] Feb. 11, 1975

[54] PROCESS FOR THE CONTINUOUS PRODUCTION OF AQUEOUS PARAFFIN EMULSIONS

[75] Inventors: Wilhelm Neier, Homberg/Niederrhein; Hans-Jurgen Lindstadt, Rheinkamp-Repelen; Werner Webers, Orsov, all of Germany

[73] Assignee: Deutsche Texaco Aktiengesellschaft, Hamburg, Germany

[22] Filed: Jan. 8, 1973

[21] Appl. No.: 322,049

[30] Foreign Application Priority Data
Jan. 11, 1972 Germany............................ 2201127

[52] U.S. Cl. ................................................ 106/271
[51] Int. Cl. .............................................. C08h 9/08
[58] Field of Search ..................................... 106/271

[56] References Cited
UNITED STATES PATENTS

| | | |
|---|---|---|
| 2,684,948 | 7/1954 | Cross .................................. 106/271 |
| 2,782,124 | 2/1957 | Von Rosenberg ................. 106/271 |
| 2,993,800 | 7/1961 | Pickell .............................. 106/271 |
| 3,354,180 | 11/1967 | Ekiss ................................. 106/271 |
| 3,374,100 | 3/1968 | Goldstein ......................... 106/271 |

Primary Examiner—Morris Liebman
Assistant Examiner—Paul R. Michl
Attorney, Agent, or Firm—T. H. Whaley; C. G. Ries

[57] ABSTRACT

The subject invention pertains to a continuous process for the production of aqueous paraffin emulsions. A primary emulsion is first formed by subjecting water and paraffin in admixture with an emulsifier and a portion of recycled primary emulsion to heat and turbulent flow. The stability of the primary emulsion is then improved by mixing said primary emulsion with another emulsifier and a portion of a recycled secondary emulsion and subjecting the mixture to heat and turbulent flow to produce said secondary emulsion. Finally, additional stability is achieved by homogenizing said secondary emulsion to produce a product emulsion.

13 Claims, 1 Drawing Figure

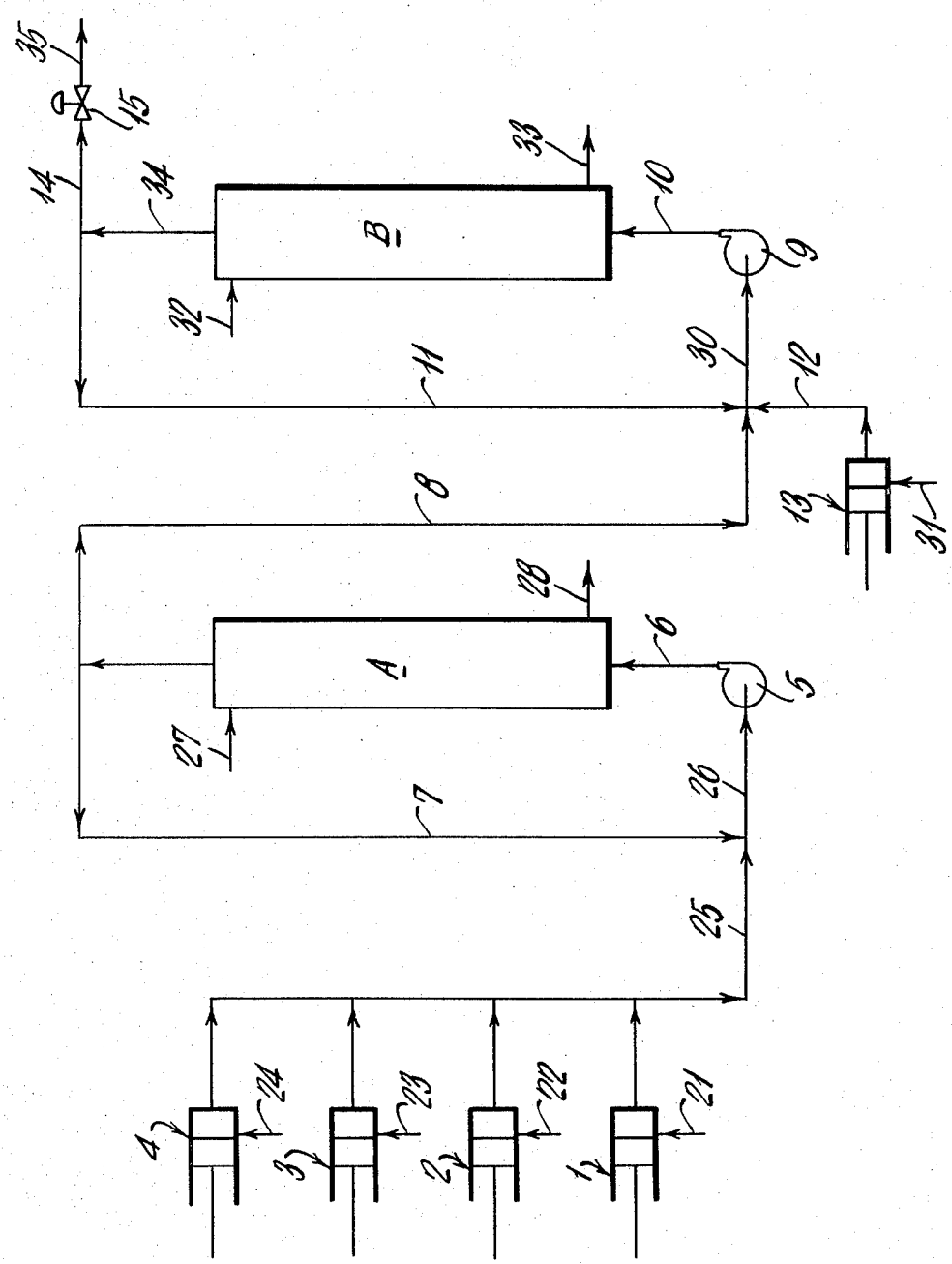

PROCESS FOR THE CONTINUOUS PRODUCTION OF AQUEOUS PARAFFIN EMULSIONS

BACKGROUND OF THE INVENTION

1. Field of the Invention:

The present invention relates to a process for continuously producing aqueous paraffin emulsions.

2. Description of the Prior Art:

Emulsions of the above type may be produced by batch processes. In batch operations, emulsification can be achieved only by adding the components in the molten state to water while stirring and simultaneously homogenizing, emulsifying, and dispersing. The paraffin particles obtained in such emulsions have a very wide range of size. Even after homogenization their size is still between 1 and 10 $\mu$. The distribution of particle size has a decisive influence on the storage stability of the aqueous paraffin emulsion. Since the stability of the emulsion decreases as the range of particle size increases, it is advantageous to produce emulsions with the narrowest possible range of particle size.

SUMMARY

The present invention pertains to a continuous multi-stage process for the production of aqueous paraffin emulsions having constant properties, e.g., paraffin particles of the most uniform size possible, constant viscosity, and good storage stability. The process stream flows serially from one stage to the next. The pressure in all stages of the process is preferably the same, less ordinary line drop. The pressure may be in the range of about 1 to 200 atmospheres, and preferably about 1 to 10 atmospheres.

The subject process for continuously producing aqueous paraffin emulsions comprises the steps of:

1. mixing together water, paraffin, a first emulsifier, and portion of a primary emulsion stream recycled from step (2) to produce a process stream;

2. passing the process stream from (1) under conditions of turbulent flow and at a temperature in the range of about 90° to 120°C, preferably 100° to 105°C. through a first heat exchange zone to produce said primary emulsion stream;

3. mixing together a portion of said primary emulsion stream from (2), a second emulsifier, and a portion of a secondary emulsion stream recycled from step (4) to produce a process stream;

4. passing the process stream from (3) under conditions of turbulent flow and at a temperature in the range of about 80° to 95°C., preferably 87° to 92°C., through a second heat exchange zone to produce said secondary emulsion stream whose stability is greater than that of said primary emulsion stream; and 5. optionally, homogenizing the uncycled portion of said secondary emulsion stream.

DESCRIPTION OF THE INVENTION

The present invention provides a multi-stage process for emulsifying paraffin and water together with a recycled portion of the emulsion product in the presence of emulsifiers under conditions of heat and turbulent flow in a heat exchanger, and preferably followed by homogenization.

In the subject emulsion, the dispersed, discontinuous, or internal phase is paraffin which is broken into globules or particles. The surrounding liquid, known as the continuous or external phase, is water. The number of stages required for the process is determined mainly by the number of emulsifier systems used. This permits one to adjust an optimum temperature range for each emulsifier.

The paraffins used as feedstock in the subject process may be normal or branched hydrocarbons containing from 15 to 40 carbon atoms, preferably from 20 to 37 carbon atoms. The paraffin feedstock has a melting point in the range of about 44° to 64°C.

Both ionic and nonionic emulsifiers are used in the subject process. For example, cationic emulsifiers are used generally in the first stage of the process. Nonionic emulsifiers are generally used in the second stage of the process. The Hydrophile-Lipophile Balance (HLB) for said emulsifiers is in the range of from 8 to 12, preferably from 9 to 11.

The ionic emulsifier may be supplied as a compound, or the constituents that form the emulsifier may be separately introduced and the emulsifier formed in situ. For example, ammonia or an amine which may be a primary, secondary, tertiary amine, e.g., triethanolamine, tripropanolamine selected from the group consisting of polyhydroxyalkylamines, and KOH may be supplied separately and mixed with a LP wax composition or high molecular aliphatic fatty acids such as stearic acid, which is also separately introduced.

Similarly, the nonionic emulsifier may be an alkoxylated derivative of compounds containing active hydrogen. For example, ethoxylated or propoxylated alcohols, amines or acids, e.g. fatty alcohol polyglycol ethers such as stearyl alcohol, coconut fatty alcohol, oleyl alcohol reacted with 5 to 20 molecules of ethyleneoxide, are used as nonionic emulsifiers. Also suitable are ethoxylated nonyl phenol and ethoxylated acid amides.

The recommended feed mixture to the first stage of the process exclusive of recycle primary emulsion from the first stage in parts by weight follows:

Water 27 to 66 parts by weight
Paraffin 33 to 67 parts by weight
Emulsifier 15 to 6, preferably 2.2 to 4.4 parts by weight The weight ratio of recycle primary emulsion from the first stage to the aforesaid feed mixture to the first stage is in the range of from about 1:1 to 200:1, and preferably from about 20:1 to 100:1.

In the second stage of the process, the recommended feed mixture to the second stage exclusive of recycle secondary emulsion from the second stage, in parts by weight follows: Primary emulsion from the first stage 96.5 to 99.2, Emulsifier 0.8 to 3.5.

The weight ratio of recycle secondary emulsion from the second stage to the aforesaid feed mixture to the second stage is in the range of from about 1:1 to 200:1, and preferably from about 20:1 to 100:1.

The selection of the ratio of feed mixture to recycle emulsion allows one to select and control any desired residence time in the emulsifying equipment. Turbulent flow as used in the subject process during emulsification improves heat transfer, adjusts the temperature profile, and prevents the components of the mixture undergoing emulsification from separating.

In the first stage of the subject process, water, paraffin, and preferably an ionic emulsifier are mixed together in the amounts previously specified to produce a stream of feed mixture. This stream of feed mixture in admixture with a stream of primary emulsion produced in and recycled from the first stage of the process in the amounts previously specified are pumped under conditions of turbulent flow at a temperature in the range of about 90° to 120°C. through a first emulsification zone until the particle size of the paraffin in the primary emulsion is in the range of about 10 to 50 microns ($\mu$). The order of addition of the constituents is determined by the optimum operating ranges and the thermal stability of the emulsifiers. Conveniently, one starts with the highest temperature in the first reactor.

In the second stage of the subject process, the uncycled portion of said primary emulsion is mixed with a stream of preferably nonionic emulsifier, in the amounts previously specified, to constitute a stream of feed mixture to said second stage. This stream of feed mixture is mixed with a secondary emulsion stream recycled from a second emulsification zone in the amounts previously specified. The mixed process stream is then pumped under conditions of turbulent flow at a temperature in the range of about 80° to 95°C. through a second emulsification zone until the particle size of the paraffin molecules is in the range of about 3 to 15 microns ($\mu$).

Finally, to increase the stability of the product emulsion, the uncycled portion of said secondary emulsion from the second stage is passed through a conventional homogenizer at a temperature in the range of about 80° to 95°C, preferably 87° to 92°C. The particle size of the paraffin in the homogenized product emulsion is in the range of about 3 to 7 microns ($\mu$). For example, a suitable homogenizer is shown in Kirk-Othmer Encyclopedia of Chemical Technology, Second Edition 1965 Interscience Publishers, Volume 8, Page 141, FIG. 5.

Turbulent flow as used herein is well known in the art and is defined in Perry's Chemical Engineers Handbook, Page 5-16, Fourth Edition 1963, McGraw-Hill Book Co.

DESCRIPTION OF THE DRAWING

A more complete understanding of the invention may be had by reference to the accompanying drawing which illustrates a preferred embodiment of this invention.

The drawing represents a flow sheet of a two-stage emulsification unit. In the first stage, the feed components such as water in line 21, paraffin in line 22, and an ionogenic (ionic) emulsifier as provided by the ingredients in lines 23 and 24 are passed by means of proportioning pumps (1,2,3,4) to circulating pump 5 by way of lines 25 and 26. Pump 5 mixes the aforesaid components in line 26 with a portion of the primary emulsion produced in state 1 and recycled via line 7. Centrifugal pump 5 mixes the components of the emulsion together and forces the mixture under conditions of turbulent flow through a conventional heat exchanger A. The design of water-jacketed heat exchanger A is of minor importance. For example, plate-type heat exchangers and tubular spiral heat exchangers have proven to be particularly useful. By passing hot water through the jacket of A, the reactor may be held at the desired temperature. For example, hot water enters heat exchanger A by way of line 27 and leaves by way of line 28.

The emulsification zone in stage I comprises pump 5 and heat exchanger A.

The uncycled portion of the primary emulsion stream leaves the first stage of the process by way of line 8 and enters the second stage. This stream of primary emulsion is mixed in line 30 with a stream of secondary emulsion produced in stage II and recycled via line 11, and with a stream of non-ionogenic (nonionic) emulsifier from line 12. The nonionic emulsifier is charged from line 31 by proportioning pump 13. By means of centrifugal pump 9, the components are mixed and passed via line 10 into jacketed heat exchanger B under conditions of turbulent flow. Heat exchanger B is cooled or heated with water depending on the desired temperature. For example, cooling water enters heat exchanger B by way of line 32 and leaves by way of line 33.

The emulsification zone in stage II comprises pump 9 and heat exchanger B. In stage II of the process, emulsification is practically completed. The emulsion leaves heat exchanger B via lines 34 and 14, valve 15, and line 35. Valve 15 may maintain the desired pressure throughout the system. Subsequently, the emulsion is preferably homogenized downstream in a conventional manner not shown.

EXAMPLE

The following example shall further illustrate the present invention.

A two-stage unit as described in the drawing is used. Each stage has a volume of 14-1. Each spiral heat exchanger has a content of 9-1 and a heat exchange surface of 1.8 m². The tubes have a nominal diameter of 25 mm. A centrifugal pump is used for circulating the materials through each tubular coil. Each reaction stage is operated under isothermal conditions by circulating hot water through the jackets of the heat exchangers. The amount of product being recycled is monitored by measuring the differential pressure by means of a perforated screen.

On an hourly basis, fifty kg of water, 45 kg of paraffin (melting range of about 54° to 56°C.), 1.5 kg of LP wax[R] (acid wax on the basis of montan wax, comprising monocarboxylic acid with a carbon number in the range of from about 20 to 37 carbon atoms), and 1.1 kg of triethanolamine are charged to the first stage together with 4,300 l of recycle primary emulsion stream from line 7. The aforesaid mixture is then pumped under conditions of turbulent flow through spiral tubular heat exchanger A. The temperature of the hot water circulating in the jacket of heat exchanger A in stage I is adjusted to maintain a process temperature of 105°C. The pressure in the first stage is about 2 to 4 atmospheres. The primary emulsion stream leaving the first stage will not separate for at least 3 hours. The paraffin in the primary emulsion has a particle size in the range of about 10 to 50 microns.

After passing through stage I, on an hourly basis, a portion of the primary emulsion stream from line 8 is mixed together in line 30 with 1.4 kg of ethoxylated fatty alcohol from line 12 and 4,300 l of recycle secondary emulsion stream from line 11. The aforesaid mixture is then pumped by means of pump 9 under conditions of turbulent flow through spiral tubular heat exchanger B. The temperature in heat exchanger B is adjusted to 89°C. by circulating hot water through the jacket. 99 kg of aqueous paraffin secondary emulsion is discharged from the system by way of lines 34, 14, valve 15, and line 35. The pressure in heat exchanger B is maintained at 3 atmospheres by pressure valve 15. The emulsification of the secondary emulsion stream leaving the second stage has reached a degree such that separation does not occur for at least 9 hours. The particle size of the paraffin in the secondary emulsion is in the range of about 3 to 15 microns.

The secondary emulsion stream from line 35 is homogenized using a centrifugal mixer, until the paraffin particles in the final emulsion product have a size in the range of about 3 to 7 microns. This emulsion product has a storage stability of more than 5 months. Further, the final test values of the emulsion product obtained over a test period of 14 days remain substantially constant. The finished paraffin emulsion has a viscosity of 5 cp. The viscosity is also in this range during the production of the emulsion.

The process of the invention has been described generally and by examples with reference to materials of particular compositions for purposes of clarity and illustration only. It will be apparent to those skilled in the art from the foregoing that various modifications of the process and materials disclosed herein can be made without departure from the spirit of the invention.

We claim:

1. Process for continuously producing an aqueous paraffin emulsion product comprising:
   1. preparing a first feed mixture by mixing together water, paraffin wax, and ionic emulsifier; mixing together a recycle stream of primary emulsion from step (2) with said first feed mixture in the weight ratio of recycle primary emulsion to said first feed mixture in the range of about 1 to 200 to produce a process stream;
   2. passing the process stream from (1) under conditions of turbulent flow through a first heat exchange zone at a temperature in the range of about 90° to 120°C. to produce said primary emulsion stream;
   3. preparing a second feed mixture by mixing together a portion of said primary emulsion stream from (2) and a nonionic emulsifier; mixing together a recycle stream of secondary emulsion from step (4) with said second feed mixture in the weight ratio of recycle secondary emulsion stream to said second feed mixture in the range of about 1 to 200 to produce a process stream;
   4. passing the process stream from (3) under conditions of turbulent flow through a second heat exchange zone at a temperature in the range of about 80° to 95°C. to produce said secondary emulsion stream whose stability is greater than that of said primary emulsion stream; and
   5. separating as the product stream the uncycled portion of said secondary emulsion stream;

2. The process of claim 1 provided with the added step of homogenizing the secondary emulsion stream from step (4) to increase its stability.

3. The process of claim 1 wherein said nonionic emulsifier in step (3) is an alkoxylated derivative of compounds containing active hydrogen.

4. The process of claim 1 wherein the particle size of the paraffin in said primary emulsion stream is in the range of about 10 to 50 microns, and the particle size of the paraffin in said secondary emulsion stream is in the range of about 3 to 15 microns.

5. The process of claim 1 wherein the materials other than recycled primary emulsion stream introduced into step (1) in parts by weight are in the following range: water 27 to 66; paraffin 33 to 67, ionic emulsifier 1.5 to 6; and the materials other than the secondary emulsion introduced into step (3) in parts by weight are in the following range: primary emulsion from the first stage 96.5 to 99.2, and nonionic emulsifier 0.8 to 3.5.

6. The process of claim 1 wherein said ionic emulsifier is formed by combining a high molecular weight aliphatic fatty acid with a base material selected from the group consisting of ammonia, primary amine, secondary amine, tertiary amine, and potassium hydroxide.

7. The process of claim 6 wherein the constituents that form said ionic emulsifier are separately introduced and said ionic emulsifier is formed in situ.

8. The process of claim 6 wherein said high molecular weight fatty acid is selected from the group consisting of montan wax having a carbon number in the range of about 20 to 37 carbon atoms and stearic acid.

9. The process of claim 6 wherein said base material is a polyhydroxyalkylamine.

10. The process of claim 9 wherein said polyhydroxyalkylamine is selected from the group consisting of triethanolamine and tripropanolamine.

11. The process of claim 1 wherein said paraffin wax has a melting point in the range of about 44° to 64°C. and is selected from the group consisting of normal or branched hydrocarbons containing 15 to 'carbon atoms.

12. The process of claim 1 wherein said nonionic emulsifier is selected from the group consisting of ethoxylated fatty alcohol, ethoxylated fatty acid, ethoxylated fatty amine, ethoxylated fatty amide, ethoxylated alkyl phenol, propoxylated fatty alcohol, propoxylated fatty amide, and propoxylated alkyl phenol.

13. The process of claim 1 wherein said nonionic emulsifier is the reaction product of a fatty alcohol selected from the group consisting of stearyl alcohol, coconut fatty alcohol, and oleyl alcohol, with 5 to 20 molecules of ethylene oxide.

* * * * *

PO-1050
(5/69)

UNITED STATES PATENT OFFICE
CERTIFICATE OF CORRECTION

Patent No. 3,865,606　　　　　　　　Dated　February 11, 1975

Inventor(s) W. Neier, H. Lindtstadt, W. Webbers

It is certified that error appears in the above-identified patent and that said Letters Patent are hereby corrected as shown below:

Col. 3 line 52　　　　change "State" to --stage-- col. 6 line 40　　　　before "carbon" insert --40--

Signed and Sealed this twenty-third Day of December 1975

[SEAL]

*Attest:*

RUTH C. MASON
*Attesting Officer*

C. MARSHALL DANN
*Commissioner of Patents and Trademarks*